United States Patent
Singh et al.

(10) Patent No.: US 7,238,299 B2
(45) Date of Patent: Jul. 3, 2007

(54) HEAT TRANSFER FLUID COMPRISING DIFLUOROMETHANE AND CARBON DIOXIDE

(75) Inventors: Ravjiv R. Singh, Getzville, NY (US); Hang T. Pham, Amherst, NY (US); Martin R. Paonessa, Niagara Falls, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/285,934

(22) Filed: Nov. 1, 2002

(65) Prior Publication Data

US 2004/0084652 A1 May 6, 2004

(51) Int. Cl.
  *C09K 5/04* (2006.01)
(52) U.S. Cl. .................. 252/67; 510/407; 510/412
(58) Field of Classification Search .................. 252/67, 252/68
  See application file for complete search history.

(56) References Cited

U.S. PATENT DOCUMENTS

| | | | |
|---|---|---|---|
| 5,340,490 A | | 8/1994 | Decaire et al. ............... 252/67 |
| 5,736,063 A | * | 4/1998 | Richard et al. ............... 252/67 |
| 5,744,052 A | * | 4/1998 | Bivens ........................ 252/67 |
| 5,763,063 A | | 6/1998 | Pass et al. ................... 428/216 |
| 5,774,052 A | | 6/1998 | Hamm et al. ................ 340/540 |
| 5,956,958 A | | 9/1999 | Dobak, III et al. ............ 62/114 |
| 6,113,803 A | | 9/2000 | Richard et al. ............... 252/67 |
| 6,117,356 A | * | 9/2000 | Powell et al. ................. 252/67 |

FOREIGN PATENT DOCUMENTS

| | | |
|---|---|---|
| DE | 41 16 274 A1 | 5/1991 |
| DE | 41 16 274 A1 | 11/1992 |
| JP | EP 1 253 185 A1 | 10/2002 |
| WO | WO 97/07181 | 2/1997 |

OTHER PUBLICATIONS

Downing, R.C., "Fluorocarbons Refrigerants Handbook," Ch. 3, Prentice-Hall (1988).

* cited by examiner

*Primary Examiner*—Gregory Webb
(74) *Attorney, Agent, or Firm*—Colleen D. Szuch

(57) ABSTRACT

Disclosed are heat transfer fluids which possess a highly desirable and unexpectedly superior combination of properties, and heat transfer systems and methods based on these fluids. The heat transfer fluid comprise from about 30 to about 70 percent, on a molar basis, of carbon dioxide ($CO_2$) and from about 30 to about 70 percent, on a molar basis, of hydrofluorocarbon (HFC), preferably HFC having one to two carbon atoms, and even more preferably difluoromethane (HFC-32). The preferred fluids of the present invention have a vapor pressure of at least about 100 psia at 40° F. and are also preferably not azeotropic.

13 Claims, No Drawings

HEAT TRANSFER FLUID COMPRISING DIFLUOROMETHANE AND CARBON DIOXIDE

FIELD OF THE INVENTION

This invention relates to heat transfer fluids, and in particular heat transfer fluids containing difluoromethane and carbon dioxide.

BACKGROUND OF THE INVENTION

It is desirable in many different situations to selectively transfer heat between a fluid and a body to be cooled or warmed. As used herein, the term "body" refers not only to solid bodies but also other fluid materials which take the shape of the container in which they exist.

One well known system for achieving such transfer of heat achieves cooling of a body by first pressurizing a vapor phase heat transfer fluid and then expanding it through a Joule-Thomson expansion element, such as a valve, orifice, or other type of flow constriction. Any such device will be referred to hereinafter simply as a Joule-Thompson "expansion element," and systems which use such an element are sometimes referred to herein as Joule-Thompson systems. In most Joule-Thomson systems, single component, non-ideal gasses are pressurized and then expanded through a throttling component or expansion element, to produce isenthalpic cooling. The characteristics of the gas used, such as boiling point, inversion temperature, critical temperature, and critical pressure effect the starting pressure needed to reach a desired cooling temperature. While such characteristics are all generally well known and/or relatively easy to predict with an acceptable degree of certainty for single component fluids, this is not necessarily the case for multi-component fluids Because of the large number of properties or characteristics which are relevant to the effectiveness and desirability of a heat transfer fluid, it is frequently difficult to predict in advance how any particular multi-component fluid will perform as a heat transfer fluid. For example, U.S. Pat. No. 5,744,052—Bivens discloses a combination of difluoromethane (HFC-32), pentafluoroethane and a small amount (ie., up to 5% by weight) of carbon dioxide in the form of an azeotropic fluid that is said to have advantages as a refrigerant in certain applications. More particularly, the multi-component fluid of Bivens is said to be non-flammable and, due to its azeotropic nature, to undergo relatively little fractionation upon vaporization. However, the combination of components in the amounts specified in Bivens produce a fluid with a relatively low vapor pressure, which can be undesirable for certain applications, for example, those which require a fluid with substantial cooling power or those in which low temperature cooling is required. Furthermore, the fluids of Bivens are comprised of relatively highly-fluorinated compounds which are potentially environmentally damaging from a global warming perspective. In addition, obtaining fluids with azeotropic properties can sometimes add significantly to the cost of such fluids when used as refrigerants.

U.S. Pat. No. 5,736,063—Richard et al. discloses a non-azeotropic combination of various hydrocarbons, including HFC-32, and carbon dioxide which form a fluid said to be acceptable as replacements for chlorodifluoromethane (HCFC-22). In particular, the Richard et al. patent teaches that the vapor pressure of this fluid is substantially equal to HCFC-22, which is only about 83 psia at 40° F. Therefore, while the fluid of Richard et al. is expected to perform well in certain refrigeration applications, it may be considered inadequate in the same types of applications mentioned above with respect to the Bivens fluid.

SUMMARY OF THE INVENTION

Applicants have discovered heat transfer fluids which possess a highly desirable and unexpectedly superior combination of properties, and heat transfer systems and methods based on these fluids. In preferred embodiments, the fluids of the present invention possess properties that have heretofore been associated with CECs, including chemical stability, low toxicity, non-flammability, and efficiency in-use, while at the same time substantially reducing or eliminating the deleterious ozone depletion potential of such refrigerants. In addition, the preferred embodiments of the present invention provide ref rigerants which also substantially reduce or eliminate the negative global warming effects associated with previously used heat transfer fluids. This difficult to achieve combination of characteristics is important, for example, in low temperature air conditioning, refrigeration and heat pump applications.

The present invention thus provides a heat transfer fluid comprising from about 30 to about 70 percent, on a molar basis, of carbon dioxide ($CO_2$) and from about 30 to about 70 percent, on a molar basis, of hydrofluorocarbon (HFC), preferably HFC having one to two carbon atoms, and even more preferably difluoromethane (HFC-32). The term "hydrofluorocarbon" as used herein means a compound having carbon, hydrogen, and fluorine atoms and no chlorine atoms. For embodiments in which the hydrocarbon comprises a major proportion of, and even more preferably consists essentially of HFC-32, the heat transfer fluid preferably comprises from about 30 to about 85 percent by weight of carbon dioxide ($CO_2$) and from about 15 to about 70 percent by weight of hydrofluorocarbon. The preferred fluids of the present invention have a vapor pressure of at least about 100 psia at 40° F. The fluids are also preferably not azeotropic.

DETAILED DESCRIPTION OF PREFERRED EMBODIMENTS

The Heat Transfer Fluids

The preferred heat transfer fluids comprise, and preferably consist essentially of, hydrofluorocarbon and $CO_2$. The type and relative amount of the hydrofluorocarbon is preferably selected to produce a heat transfer fluid which has a coefficient of performance, as defined hereinafter, of at least about 1.9 and which optionally by preferably is at the same time non-flammable. As used herein, the term non-flammable refers to a fluid which is non-flammable in all proportions in air as measured by ASTM E-681.

For embodiments in which the hydrofluorocarbon comprises HFC-32, advantageous properties are unexpectedly achieved for fluids having an HFC-32:$CO_2$ weight ratio of from about 0.3 to about 1.5, more preferably from about 0.4 to about 1.4, and even more preferably from about 0.4 to about 0.7. While it is contemplated that in certain embodiments the present heat transfer fluids may contain components other than hydrofluorocarbon and $CO_2$, it is generally preferred that these two components together comprise a major proportion, and even more preferably at least about 90% by weight of the heat transfer fluid. In certain embodiments, such as those in which both performance and non-flammability are especially important, it is preferred that the heat transfer fluid comprise, and preferably consist of, from about 45 to about 75 mole % $CO_2$ and from about 15 to about 55 mole % hydrofluorocarbon, with fluids comprising from about 54 to about 75 mole % $CO_2$ and from about 25 to about 45 mole % hydrofluorocarbon, preferably HFC-32, being even more preferred. In highly preferred embodiments, the heat transfer fluid consists essentially of, and in certain embodiments consists of, hydrofluorocarbon (preferably HFC-32) and $CO_2$.

The heat transfer fluids of the present invention are adaptable for use in a wide variety of heat transfer applications, and all such applications are within the scope of the present invention. The present fluids find particular advantage and unexpectedly beneficial properties in connection with applications that require and/or can benefit from the use of highly efficient, non-flammable ref rigerants that exhibit low or negligible global warming effects, and low or no ozone depletion potential. The present fluids also provide advantage to low temperature refrigeration applications, such as those in which the refrigerant is provided at a temperature of about −40° F. or less and which have relatively high cooling power. In this regard, embodiments of the present invention include heat transfer fluids having a vapor pressure of at least about 150 psia, more preferably at least about 200 psia, and even more preferably of at least about 280 psia, measured at 40° F.

The preferred heat transfer fluids are highly efficient in that they exhibit a coefficient of performance (COP) that is high relative to the COP of the individual components of the fluid and/or relative to many refrigerants which have previously been used. In preferred embodiments, the present heat transfer fluids have a COP of at least about 1.9, more preferably at least about 2.0, and even more preferably at least about 2.1. The term COP is well known to those skilled in the art and is based on the theoretical performance of a refrigerant at specific operating conditions as estimated from the thermodynamic properties of the refrigerant using standard refrigeration cycle analysis techniques. See, for example, "Fluorocarbons Refrigerants Handbook", Ch. 3, Prentice-Hall, (1988), by R. C. Downing. The coefficient of performance, COP, is a universally accepted measure, especially useful in representing the relative thermodynamic efficiency of a refrigerant in a specific heating or cooling cycle involving evaporation or condensation of refrigerant. COP is related to or a measure of the ratio of useful refrigeration to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. For the purposes of the present specification and claims, the COP of a heat transfer fluid refers to the COP of that fluid as measured in accordance with the process parameters specified in the Comparative Example 1 hereof.

As mentioned before, additional components known to those skilled in the art may be added to the mixture to tailor the properties of the heat transfer fluid according to the need.

The Methods and Systems

The method aspects of the present invention comprise transferring heat to or from a body using a heat transfer fluid in accordance with the present invention. Those skilled in the art will appreciate that many known methods may adapted for use with the present invention in view of the teachings contained herein, and all such methods are within the broad scope hereof. For example, vapor compressions cycles are methods commonly used for refrigeration. In its simplest form, the vapor compression cycle involves providing the present heat transfer fluid in liquid form and changing the refrigerant from the liquid to the vapor phase through heat absorption, generally at relatively low pressure, and then from the vapor to the liquid phase through heat removal, generally at an elevated pressure. In such embodiments, the refrigerant of the present invention is vaporized in one or more vessels, such as an evaporator, which is in contact, directly or indirectly, with the body to be cooled. The pressure in the evaporator is such that vaporization of the heat transfer fluid takes place at a temperature below the temperature of the body to be cooled. Thus, heat flows from the body to the refrigerant and causes the refrigerant to vaporize. The heat transfer fluid in vapor form is then removed, preferably by means of a compressor or the like which at once maintains a relatively low pressure in the evaporator and compresses the vapor to a relatively high pressure. The temperature of the vapor is also generally increased as a result of the addition of mechanical energy by the compressor. The high pressure vapor then passes to one or more vessels, preferably a condenser, whereupon heat exchange with a lower temperature medium removes the sensible and latent heats, producing subsequent condensation. The liquid refrigerant, optionally with further cooling, then passes to the expansion valve and is ready to cycle again.

In one embodiment, the present invention provides a method for transferring heat from a body to be cooled to the present heat transfer fluid comprising compressing the fluid in a centrifugal chiller, which may be single or multi-stage. As used herein, the term "centrifugal chiller" refers to one or more pieces of equipment which cause an increase in the pressure of the present heat transfer fluid.

The present methods also provide transferring energy from the heat transfer fluid to a body to be heated, for example, as occurs in a heat pump, which may be used to add energy to the body at a higher temperature. Heat pumps are considered reverse cycle systems because for heating, the operation of the condenser is generally interchanged with that of the refrigeration evaporator.

The present invention also provides methods, systems and apparatus for cooling of objects or very small portions of objects to very low temperatures, sometimes referred to herein for the purposes of convenience, but not by way of limitation, as micro-freezing. The objects to be cooled in accordance with the present micro-freezing methods may include biological matter, electronic components, and the like. In certain embodiments, the invention provides for selective cooling of a very small or even microscopic object to a very low temperature without substantially affecting the temperature of surrounding objects. Such methods, which are sometimes referred to herein as "selective micro-freezing," are advantageous in several fields, such as for example in electronics, where it may be desirable to apply cooling to a miniature component on a circuit board without substantially cooling adjacent components. Such methods may also provide advantage in the field of medicine, where it may be desirable cool miniature discrete portions of biological tissue to very low temperatures in the performance of cryosurgery, without substantially cooling adjacent tissues.

Cryosurgery methods of the present invention include, but are not limited to, medical (such as gynecology, dermatology, neurosurgery and urology), dental, and veterinary procedures. Unfortunately, currently known instruments and methods for selective micro-freezing have several limitations which make their use difficult or impossible in such fields. Specifically, known systems do not always have sufficient precision and flexibility to allow their widespread use in endoscopic and percutaneous cryosurgery.

One major advantage of the present methods and systems is the ability to provide relatively low temperature cooling with systems and methods that require relatively simple equipment and/or require only moderately elevated pressures. By way of contrast, typical prior art cryosurgical methods used liquid nitrogen or nitrous oxide as coolant fluids. Liquid nitrogen is usually either sprayed onto the tissue to be destroyed, or it is circulated to cool a probe which is applied to the tissue. Liquid nitrogen has an extremely low temperature of approximately 77° K., and a high cooling capacity, making it very desirable for this purpose. However, liquid nitrogen typically evaporates and escapes to the atmosphere during use, requiring the continual replacement of storage tanks. Further, since the liquid is so cold, the probes and other equipment used for its application require vacuum jackets or other types of insulation to protect the surrounding tissue. This makes the probes relatively complex, bulky, and rigid, and therefore unsuitable for endoscopic or intravascular use. The need for relatively bulky supply hoses and the progressive cooling of all the related components make the liquid nitrogen instruments less than comfortable for the physician, as well, and they can cause undesired tissue damage. Furthermore, nitrous oxide systems used in cryosurgery pressurize the gas to 700 to 800 psia in order to reach practical cooling temperatures of no lower than about 190° K. to 210° K.

In the preferred systems and methods of the present invention, particularly cooling apparatus use in the production of lasers, superconductors and electronics, and in cryosurgery, the system and methods operate effectively and with a high degree of efficiency using a heat transfer fluid of the present invention and a fluid let-down pressure less than about 420 psia.

The preferred micro-freezing systems and methods of the present invention avoid the need for, and preferably do not use, finned tube heat exchangers since such equipment tends to be prohibitively bulky to achieve the required precise and small area cooling. In preferred embodiments, the systems and methods utilize a cooling probe which is less than approximately 5 mm. in width to allow incorporation into or passage through a catheter or endoscope. Thus, certain aspects of the present invention provide a long, slender (most preferably less than about 3 mm in width), and flexible cryoprobe, such as a transvascular cardiac catheter.

EXAMPLES

Example 1

A heat transfer fluid consisting essentially of 50% by weight of HFC-32 and 50% by weight of $CO_2$ was tested in accordance with the procedure outlined in Example 1 of U.S. Pat. No. 5,744,052 (hereafter the '052 patent). The resulting vapor pressures was measured at 25° C. and found to be as follows:

| Wt. % Evaporated | Vapor Pressure @ 25° C. |
|---|---|
| 0 | 577 psia (3976 kPa) |
| 50 | 478 psia (3295 kPa) |

This large change (21 relative %) in vapor pressure with amount of fluid vaporized establishes that the heat transfer fluid of the present invention is non-azeotrope-like, which is in contrast to the compositions described in column 3, line 5, of the '052 patent. In addition, this result demonstrates that the present heat transfer fluids possess a vapor pressure, even after a 50% evaporation rate, that is almost twice that of the fluids disclosed '052 patent.

Example 2

Various heat transfer fluids consisting essentially of HFC-32 and $CO_2$ were tested for vapor pressure at 40° F. for comparison to the vapor pressure of HCFC-22 at 40° F., that is, 83 psia. This is the equivalent vapor pressure claimed for the ternary blends described U.S. Pat. No. 5,736,063. The vapor pressure results are reported below:

| Wt. % HFC-32 | Vapor Pressure @ 40 F. |
|---|---|
| 60 | 251 psia |
| 50 | 288 psia |
| 40 | 328 psia |
| 30 | 378 psia |

This example shows that heat transfer fluids in accordance with the present invention have vapor pressures that are 3 to 5 times higher than HCFC-22.

Example 3

This example shows advantages of the present heat transfer fluids relative to HFC-32 as a single component heat transfer fluid. Flammability of refrigerant gases can be determined by preparing various compositions and testing them by the ASTM E-681 method published by the American Society for Testing of Materials, which is incorporated herein by reference. HFC-32 is known to be a flammable gas and precludes its use as a single component refrigerant in many important applications. Applicants have tested various combinations of HFC-32 and $CO_2$ and discovered that the maximum amount of the HFC-32 that can be present in heat transfer fluid blend consisting essentially of $CO_2$ and HFC-32 while remaining nonflammable in all proportions in air (as determined by ASTM E-681) is about 55 mol % (59 wt %). In other words, applicants have discovered that heat transfer fluids of the present invention containing at least 45 mol % (about 40 wt %) $CO_2$, and preferably no more than 55 mol % (about 60 wt %) HFC-32, are non-flammable in all proportions in air.

Comparative Example 1

This example illustrates the performance characteristics of a heat transfer fluid consisting essentially of pure $CO_2$ in an auto air conditioning system. The test conditions are as follows:

| | |
|---|---|
| Mean Evaporator temp | 40° F. |
| Mean Condensor temp | 150° F. |
| Sub cool temperature | 130° F. |
| Return gas temperature | 70° F. |
| Compressure efficiency | 80% |
| Cooling load | 1000 BTU/hr |

Under these conditions, the following data is obtained for discharge pressure ("DP"), discharge temperature ("DT"), compression ratio and coefficient of performance ("COP" as defined above).

| DP, psig | DT, ° F. | Comp. Ratio | COP |
|---|---|---|---|
| 1090 | 198 | 2.1 | 1.61 |

Example 5

The same test conditions as described in Comparative Example 1 are used to test a series of heat transfer fluids in accordance with the present invention. The fluids tested consist essentially of HFC-32 and $CO_2$.

The following data is obtained for discharge pressure ("DP"), discharge temperature ("DT"), compression ratio and coefficient of performance ("COP" as defined above).

| Wt. % HFC-32 | DP, psig | DT, F | Comp. Ratio | COP |
|---|---|---|---|---|
| 60 | 1026 | 288 | 3.9 | 1.99 |
| 50 | 1053 | 278 | 3.5 | 1.90 |
| 40 | 1071 | 258 | 3.2 | 2.15 |
| 30 | 1080 | 239 | 3.8 | 2.11 |

As can be seen from the results reported above, heat transfer fluids in accordance with the present invention have significantly higher energy efficiency than $CO_2$ alone. Moreover, the high efficiency, as demonstrated by the high COP, is present in preferred compositions which contain at least about 45 mol % (41 wt %) Of $CO_2$ and which are therefore also nonflammable. Furthermore, this example illustrates that a heat transfer fluid in accordance with the present invention is capable of having performance similar to HCFC-22 while remaining nonflammable, even after substantial vapor leakage.

It is apparent that many modifications and variations of this invention as hereinabove set forth may be made without departing from the spirit and scope thereof. The specific embodiments are given by way of example only and the invention is limited only by the terms of the appended claims.

We claim:

1. A heat transfer fluid consisting essentially of at least about 45 mol percent carbon dioxide ($CO_2$) and not greater than about 55 mol percent of difluoromethane (HFC-32) in a HFC-32:$CO_2$ weight ratio of from about 0.4 to about 0.7.

2. The fluid of claim 1 having a vapor pressure of at least about 200 psia at 40° F.

3. The fluid of claim 1 having a coefficient of performance (COP) of at least about 1.9.

4. The fluid of claim 3 wherein said fluid is non-flammable.

5. The fluid of claim 3 having a COP of at least about 2.0.

6. The fluid of claim 5 wherein said fluid is non-flammable.

7. A process for changing the heat content of a body comprising proving the fluid of claim 1 and transferring heat between said fluid and said body.

8. The process of claim 7 comprising providing a fluid in accordance with claim 1 in a liquid phase and thereafter evaporating said liquid phase fluid by transferring heat from said body to said fluid.

9. The process of claim 7 comprising providing a fluid in accordance with claim 1 in a vapor phase and thereafter condensing said vapor phase fluid by transferring heat from said fluid to said body.

10. An improved heat transfer system comprising at least one heat transfer fluid and one or more vessels for evaporating and condensing the heat transfer fluid, the improvement characterized by said at least one heat transfer fluid being a non-flammable fluid consisting essentially of difluoromethane (HFC-32) and carbon dioxide ($CO_2$) in a HFC-32:$CO_2$ weight ratio of from about 0.5 to about 1.4.

11. A heat transfer fluid consisting essentially of $CO_2$ in an amount of from about 54 to about 75 percent on a molar basis and difluaromethane in an amount of from about 25 to about 45 percent on a molar basis.

12. The fluid of claim 11 wherein said fluid has a coefficient of performance of at least about 2.0.

13. A heat transfer fluid consisting essentially of carbon dioxide ($CO_2$) and difluoromethane (HFC-32) in a HFC-32:$CO_2$ weight ratio of from about 0.4 to about 0.7.

* * * * *